United States Patent
Reus et al.

(10) Patent No.: US 8,788,635 B2
(45) Date of Patent: Jul. 22, 2014

(54) MITIGATIONS FOR POTENTIALLY COMPROMISED ELECTRONIC DEVICES

(75) Inventors: Edward F. Reus, Woodinville, WA (US); Joseph G. Dadzie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 31 days.

(21) Appl. No.: 12/408,108

(22) Filed: Mar. 20, 2009

(65) Prior Publication Data

US 2010/0241739 A1    Sep. 23, 2010

(51) Int. Cl.
*G06F 15/177*   (2006.01)
*G06F 15/16*    (2006.01)
*G06F 21/88*    (2013.01)
*G06F 21/62*    (2013.01)

(52) U.S. Cl.
CPC ........ *G06F 21/62* (2013.01); *G06F 2221/2143* (2013.01); *G06F 21/88* (2013.01)
USPC .............................. 709/221; 709/204; 709/222

(58) Field of Classification Search
CPC .. G06F 21/62; G06F 21/88; G06F 2221/2143
USPC .......................................... 709/204, 221, 222
See application file for complete search history.

(56) References Cited

U.S. PATENT DOCUMENTS

| | | | |
|---|---|---|---|
| 7,352,283 B2 | 4/2008 | Velhal et al. | |
| 2006/0079204 A1 | 4/2006 | Pon et al. | |
| 2006/0112418 A1 | 5/2006 | Bantz et al. | |
| 2007/0056043 A1* | 3/2007 | Onyon et al. | ................... 726/26 |
| 2007/0199076 A1* | 8/2007 | Rensin et al. | ................... 726/27 |
| 2007/0294529 A1 | 12/2007 | Blair et al. | |
| 2008/0009264 A1 | 1/2008 | Brown et al. | |
| 2008/0034224 A1 | 2/2008 | Ferren et al. | |
| 2008/0141382 A1 | 6/2008 | Jonas | |
| 2008/0215720 A1 | 9/2008 | Westin | |
| 2008/0301820 A1 | 12/2008 | Stevens | |

FOREIGN PATENT DOCUMENTS

| | | |
|---|---|---|
| CN | 101004718 A | 7/2007 |
| EP | 2031537 A1 | 3/2009 |
| JP | H08-272742 A | 10/1996 |
| JP | H09-215057 A | 8/1997 |

(Continued)

OTHER PUBLICATIONS

"International Search Report", Mailed Date: Aug. 31, 2010, Application No. PCT/US2010/026723, Filed Date: Mar. 9, 2010, pp. 9.

(Continued)

*Primary Examiner* — David X Yi
(74) *Attorney, Agent, or Firm* — Jim Sfekas; Alin Corie; Micky Minhas

(57) ABSTRACT

An electronic device may be reported as potentially compromised (e.g., by a user or by the electronic device itself). An instruction to initiate remediation of the electronic device may be queued. Upon reaching the end of the queue, the instruction is transmitted to the electronic device to initiate remediation of the electronic device. The instruction is received by the electronic device. The remediation policy is performed, which may include performing operations such as deleting an encryption key, deleting data, disabling a login capability, disabling a boot up functionality, disabling a function associated with the electronic device, transmitting data from the electronic device, transmitting a message from the electronic device, or generating information that indicates of a user of the electronic device.

16 Claims, 12 Drawing Sheets

(56) References Cited

FOREIGN PATENT DOCUMENTS

| JP | 2001-230858 A | 8/2001 |
|---|---|---|
| JP | 2003-070070 A | 3/2003 |
| JP | 2003-288273 A | 10/2003 |
| JP | 2003-323344 A | 11/2003 |
| JP | 2005-071219 A | 3/2005 |
| JP | 2006-148431 A | 6/2006 |
| JP | 2008-546253 A | 12/2008 |

OTHER PUBLICATIONS

"Security for Windows CE Mobile Devices that Provides Protection for Corporate Data and Systems", retrieved at <<http://www.stglobal.es/Docs/WAVELINK/ps_avces.pdf>>, 2007, pp. 2.

"Nokia Intellisync Mobile Suite", retrieved at <<http://www.e-s-e.co.uk/intellisync>>, 2007, pp. 3.

"FNSuite Description", retrieved at <<http://handheld.softpedia.com/get/Security/Utilities/FNSuite-73378.shtml>>, Jan. 26, 2009, pp. 3.

"KeyPoint Vault", retrieved at <<http://www.opensystems.com.au/keypoint_vault.pdf>>, pp. 2, Jul. 19, 2008.

Ricker, Thomas., "Ericsson and Intel Developing Remote Kill Switch with GPS Locator for Stolen Laptops", retrieved at <<http://www.engadget.com/2008/12/11/ericsson-and-intel-developing-remote-kill-switch-with-gps-locato/>>, Dec. 11, 2008, pp. 25.

Office Action received for Chinese Patent Application No. 201080013559.8, mailed on Mar. 26, 2013, 10 pages of Chinese Office action and 3 Pages of English translation.

"Supplementary European Search Report for EP Patent Application No. 10753892.8", Mailed Date: Aug. 29, 2013, Filed Date: Mar. 9, 2010, 6 Pages.

"First Office Action Received for Japanese Patent Application No. 2012-500834", Mailed Date: Feb. 7, 2014, Filed Date: Mar. 9, 2010, 10 Pages.

* cited by examiner

MITIGATIONS FOR POTENTIALLY COMPROMISED ELECTRONIC DEVICES

BACKGROUND

Frequently, announcements are made in the media of another lost or stolen laptop computer or other electronic device from some company or government agency that stores private employee or customer data. The loss of an electronic device incurs a significant risk to such data, as well as to other forms of data such as intellectual property.

Employees frequently travel with valuable corporate assets on their laptop computers. Furthermore, company staff may travel between sites, attend conferences, and visit customers with laptop computers loaded with private data. Marketing, finance, engineering, company executives, and further key employees are all potential targets of not just common theft, but also of corporate spying. The loss of corporate information may have real immediate consequences. For example, the loss of private financial, investment, or future product data may have an immediate effect on a company's stock and future plans. The effects of the loss of private customer data may range from embarrassment and inconvenience to a serious legal concern and financial threat from lawsuits.

Many business and governmental entities implement techniques for securing data on electronic devices used by employees of the entities. Such techniques tend to focus on data encryption, and have been adopted in relatively low amounts due to various limitations. For instance, data encryption systems may be difficult or expensive to set up and maintain over time, and a fear may exist that encrypted data may become irretrievable when an employee forgets their private password or permanently departs the entity. These limitations are worsened when the electronic devices reside outside of an internal network and security domain of the entity, because automated key escrow systems may rely on the electronic device being directly accessible to the key escrow system. Furthermore, the unlocking of data may be cumbersome for the employee even when there is a key escrow policy in place.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for enabling remediation in electronic devices that are potentially compromised. In one implementation, a method in a management system is provided. An indication is received that an electronic device is at least potentially compromised. An instruction is queued to initiate remediation of the electronic device. The instruction is transmitted to the electronic device to initiate remediation of the electronic device.

In an example aspect, receiving the indication that the electronic device is at least potentially compromised may include: enabling a user to log into a management service, enabling the user to indicate a missing device, enabling a list to be displayed of one or more electronic devices associated with the user, enabling the user to select the electronic device from the list, indicating one or more details regarding the selected electronic device to the user, and enabling the user to confirm that the selected electronic device is at least potentially compromised.

In another example aspect, the indication that the electronic device is at least potentially compromised is received from the electronic device.

In an example aspect, transmitting the instruction to the electronic device may include: receiving the instruction from the queue, retrieving contact information for the electronic device, retrieving a remediation policy for the electronic device, establishing a connection with the electronic device, and initiating the remediation policy for the electronic device over the connection.

In a further example aspect, an indication may be received that the electronic device is not missing. A second instruction is transmitted to the electronic device to initiate recovery of the electronic device.

In another implementation, a method in an electronic device is provided. An instruction to enact a remediation policy is received. The remediation policy is performed, which may include performing one or more operations such as deleting an encryption key, deleting data, disabling a login capability, disabling a boot up functionality, disabling a function associated with the electronic device, transmitting data from the electronic device, transmitting a message from the electronic device, or generating information that indicates a user of the electronic device. Furthermore, an alert may be transmitted to an owner of the electronic device at a communication device alternative to the electronic device. The alert may request verification from the owner that the electronic device is potentially compromised, and may request instructions for subsequent remediation-related or non-remediation related actions.

In an example aspect, generating the information that indicates a user of the electronic device may include one or more of: capturing an image of the user, recording audio of the user, identifying a mobile phone, recording an interaction of the user with the electronic device, tracking a location of the electronic device, or reading a radio frequency identification (RFID) chip.

In a further example aspect, receiving the instruction to enact a remediation policy may include detecting a behavior associated with a misappropriation of the electronic device, and generating the instruction as a result of the detecting. In an example aspect, detecting a behavior associated with a misappropriation of the electronic device may include: receiving a behavior event, correlating the behavior event with a behavior set, removing any behavior events of the behavior set having occurred outside of a predetermined time window, determining whether a set of behavior events associated with the behavior set have occurred, and enabling the remediation policy to be performed if the set of behavior events associated with the behavior set is determined to have occurred.

In another implementation, a management system is provided. The management system includes a network interface, a system management interface module, and an instruction queue module. The network interface is configured as a communication interface with a network. The system management interface module is configured to provide a user interface to enable an indication to be provided that an electronic device is at least potentially compromised, and to generate a device remediation instruction. The instruction queue module is configured to queue the device remediation instruction. The message service module is configured to transmit the device remediation instruction to the electronic device to initiate remediation of the electronic device.

In another implementation, an electronic device is provided. The electronic device includes a network interface, a device remediation module, and a suspicious activity detector module. The network interface is configured as a communication interface with a network. The device remediation module is configured to receive an instruction to enact a remediation policy, and to perform the remediation policy. The suspicious activity detector module is configured to detect a behavior associated with a misappropriation of the electronic device, and to generate the instruction as a result of detecting the behavior.

Computer program products are also described herein for enabling remediation of potentially compromised electronic devices, and for further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 19:
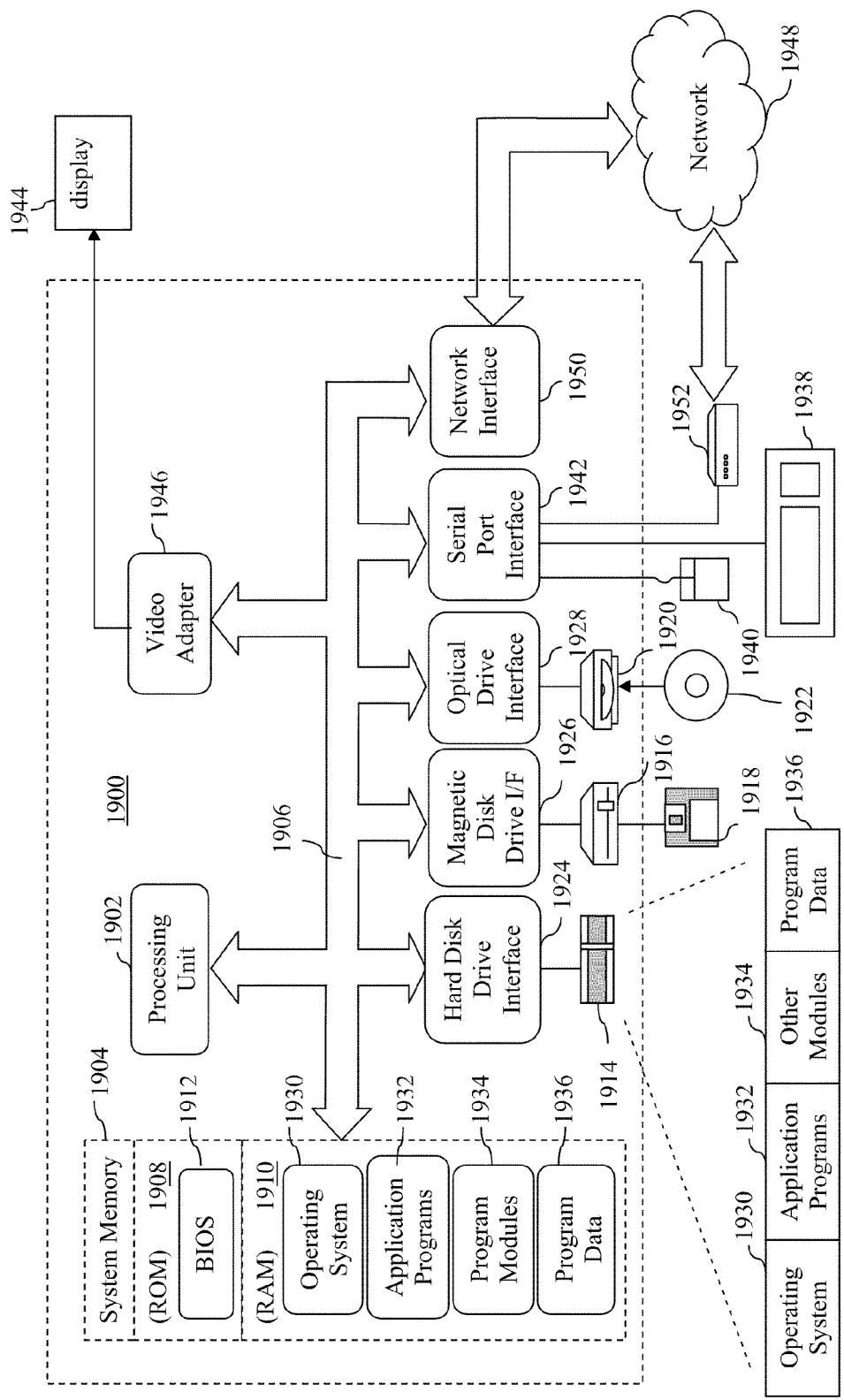

FIG. 19 shows a block diagram of an example computer that may be used to implement embodiments of the present invention of the present invention The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
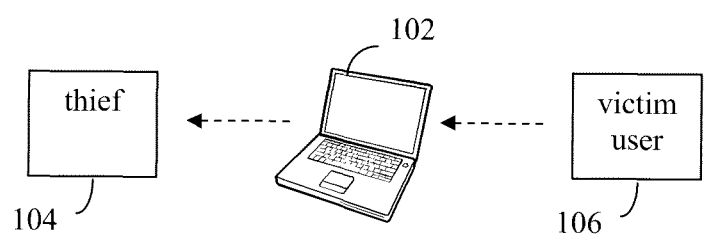
FIG. 1 shows a block diagram of a data communication system, according to an example embodiment of the present invention.

Electronic devices, such as laptop or handheld computers, are frequently lost or stolen. For instance, FIG. 1 shows an example electronic device 102 being misappropriated. As shown in FIG. 1, a thief 104 steals or otherwise misappropriates electronic device 102 from a victim user 106. Although in the example of FIG. 1, electronic device 102 is shown as a laptop computer, electronic device 102 may be any of a variety of electronic devices capable of storing and/or processing data in electronic (e.g., digital) form, including a notebook computer, a mobile device such as a personal digital assistant (PDA), a cell phone, a smart phone (e.g., a RIM Blackberry® device, a Palm® Treo™ device, etc.), etc.

Electronic device 102 may be owned by victim user 106 or by an entity (e.g., a business, a governmental entity, etc.) that provides electronic device 102 to victim user 106. The owner of electronic device 102 may incur a significant loss if valuable data stored on electronic device 102 is misappropriated. Examples of such valuable data include credit card, banking, or other financial account information, personal private data, message information including emails and/or text messages, corporate data, intellectual property (e.g., information regarding inventions), etc. Many business and governmental entities frequently implement techniques for securing data on electronic devices used by employees of the entities. Such techniques tend to focus on data encryption, and have been adopted in relatively low amounts due to various limitations.

With the Internet becoming more pervasive in the wireless world, a more flexible and powerful system becomes possible. An electronic device can be remotely managed from Internet-based services, such as web services, extending the ability of a remote access to the electronic device in the event that the electronic device is determined to be missing or stolen. With the integration of cellular style digital networks and laptop computers, for example, these electronic devices may be remotely accessed even when "turned off." Native hardware support for encryption and other theft mitigations can enable more secure solutions than the current mostly pure software encryption solutions.

Embodiments of the present invention overcome deficiencies of conventional techniques for securing electronic devices. Examples of such embodiments are described in the following section.

II. Example Embodiments

The example embodiments described herein are provided for illustrative purposes, and are not limiting. Furthermore, additional structural and operational embodiments, including modifications/alterations, will become apparent to persons skilled in the relevant art(s) from the teachings herein.

Embodiments of the present invention relate to the securing of data stored on electronic devices, such as electronic device 102 shown in FIG. 1. In embodiments, an electronic device may be reported by a user as missing and/or the electronic device itself may be configured to determine that it has been misappropriated. In response, the electronic device may be instructed to perform one or more procedures to mitigate such compromising of the electronic device.

Figure 2:
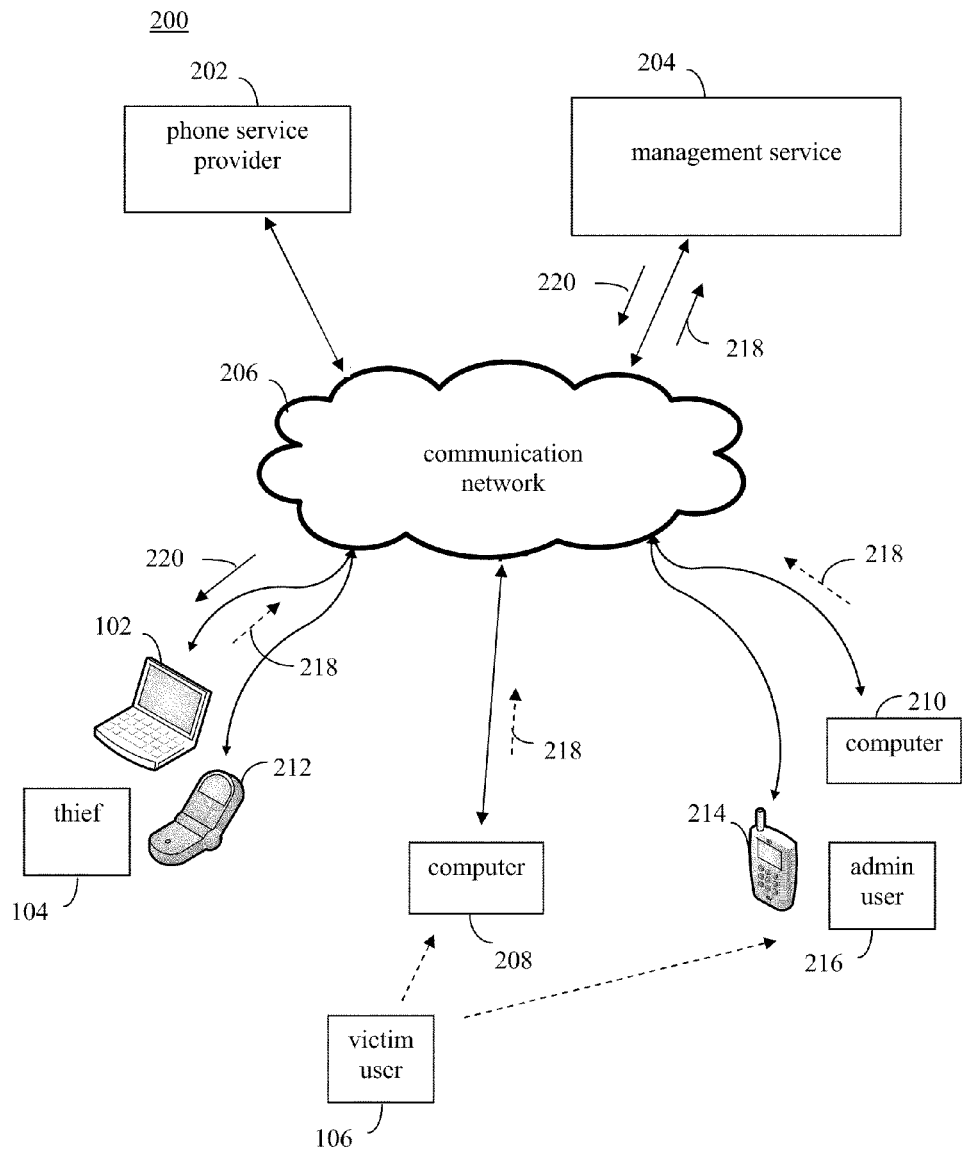
FIG. 2 shows a block diagram of a security system, according to an example embodiment of the present invention.

For instance, FIG. 2 shows a block diagram of a device data security system 200, according to an example embodiment. As shown in FIG. 2, system 200 includes a phone service provider 202, a management service 204, and a communication network 206. As shown in FIG. 2, electronic device 102, a first computer 208, a second computer 210, a first communication device 212, and a second communication device 214 are communicatively coupled to network 206. Electronic device 102 and communication device 212 are associated with thief 104. Computer 210 and communication device 214 are associated with an admin user 216. System 200 is described as follows.

First and second computers 208 and 210 may each be any type of computing device, including a desktop computer (e.g., a personal computer), a mobile computer or computing device (e.g., a Palm® device, a RIM Blackberry® device, a personal digital assistant (PDA), a laptop computer, a notebook computer, etc.), or other type of computer. First and second communication devices 212 and 214 may each be any type of communication device or device that includes communication functionality, including a mobile phone such as a cell phone or smart phone. Network 206 may include one or more communication links and/or communication networks, wired and/or wireless, such as a PAN (personal area network), a LAN (local area network), a WAN (wide area network), or a combination of networks, such as the Internet, and may include one or more telecommunications networks, wired or wireless, such as a GSM (Global System for Mobile communications) network, a 3G network, and/or further networks. Communication links that couple electronic device 102, first computer 208, and second computer 210 to network 206 may be wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

Phone service provider 202 is a telephone company that provides telecommunications services such as telephony and data communications. For example, phone service provider 202 may enable telephony and/or data communications between management service 204, electronic device 102, first communication device 212, and second communication device 214. Management service 204 is a service configured to enable data security with regard to electronic devices such as electronic device 102. Management service 204 may be implemented in hardware, software, firmware, or any combination thereof. For example, management service 204 may be implemented as computer program code configured to be executed in one or more processors. Alternatively, management service 204 may be implemented as hardware logic/electrical circuitry.

In embodiments, management service 204 and electronic device 102 may be configured in various ways to perform remediation when electronic device 102 is potentially compromised. A user or electronic device 102 itself may determine that electronic device 102 is potentially compromised. As a result, management service 204 may instruct electronic device 102 to perform one or more procedures to mitigate the potential compromising of electronic device 102. The following subsections further describe example embodiments for mitigating the potential comprising of electronic device 102.

A. Example Management Service Embodiments

Figure 3:
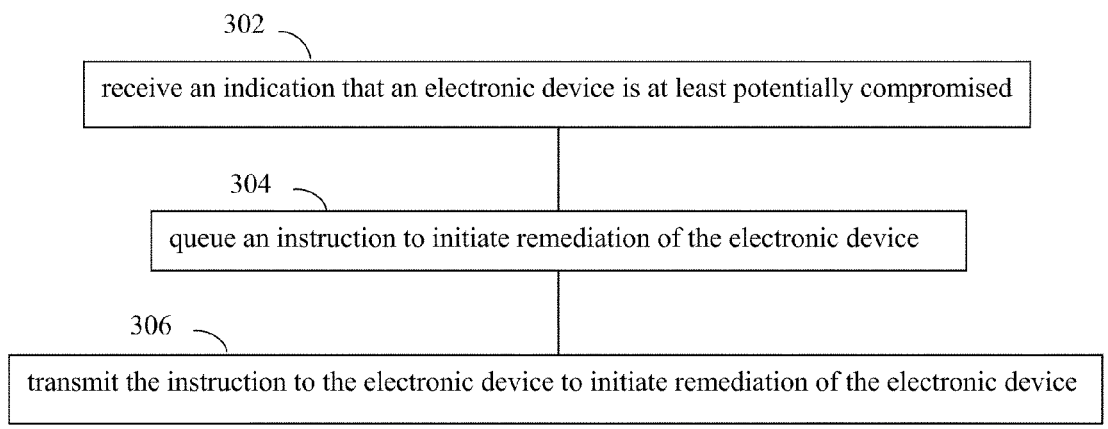
FIG. 3 shows a flowchart providing a process for performing remediation of a potentially compromised electronic device, according to an example embodiment of the present invention.

Management service 204 may operate in system 200 in various ways to perform remediation of an electronic device, such as electronic device 102, which has been lost, or stolen or otherwise become possessed by thief 104. For instance, FIG. 3 shows a flowchart 300 providing a process for performing remediation of a potentially compromised electronic device, according to an example embodiment. In an embodiment, flowchart 300 may be performed by management service 204. Other structural and operational embodiments will be apparent to persons skilled in the relevant art(s) based on the discussion regarding flowchart 300.

As shown in FIG. 3, flowchart 300 begins with step 302. In step 302, an indication that an electronic device is at least compromised is received. For instance, as shown in FIG. 2, management service 204 may receive a first communication signal 218 that contains an indication that electronic device 102 is at least potentially compromised (e.g., is unaccounted for, is missing, is believed to be stolen, is known to be stolen). First communication signal 218 may be generated by electronic device 102, first computer 218, or by second computer 210. For instance, electronic device 102 may be configured to predict that it has been compromised, and as a result, may transmit the indication to management service 204 (via first communication signal 218). In another example, upon determining that electronic device 102 is missing, victim user 106 may interact with computer 208 to provide the indication to management service 204 (via first communication signal 218). Alternatively, victim user 106 may communicate to admin user 216 that electronic device 102 may have been compromised. Admin user 216 may be a system administrator or other information technology (IT) representative that manages electronic devices, including electronic device 102, for an entity. As a result, admin user 216 may interact with computer 210 to provide the indication to management service 204 (via first communication signal 218). In still another instance, admin user 216 may determine that electronic device 102 may be compromised. For instance, instead of electronic device 102 having been lost or stolen from victim user 106, electronic device 102 may have been assigned to an employee that subsequently departed (e.g., quit, retired, or was fired) from a company. Thus, the company may desire to decommission electronic device 102 and/or to secure data stored on electronic device 102 before the employee (inadvertently or purposefully) misappropriates the data. Admin user 216 may interact with computer 210 to provide an indication to management service 204 (via first communication signal 218) that electronic device 102 may have been decommissioned or compromised.

In step 304, an instruction to initiate remediation of the electronic device is queued. In an embodiment, as a result of receiving first communication signal 218 indicating that electronic device 102 may be compromised, management service 204 may generate an instruction to initiate remediation of electronic device 102, and may input the generated instruction into a queue maintained by management service 204. Note that step 304 is optional. In an embodiment, an instruction to initiate remediation of the electronic device may be implemented (e.g., transmitted) by management service 204 immediately upon generation of the instruction without being queued. Furthermore, in an embodiment, when a queue is present, instructions may be prioritized in the queue, such that instructions considered to be higher priority (e.g., for electronic devices confirmed to be stolen versus electronic devices that were lost) can be moved through the queue relatively more quickly, while instructions considered to be lower priority can be moved through the queue relatively less quickly.

In step 306, the instruction is transmitted to the electronic device to initiate remediation of the electronic device. In an embodiment, as shown in FIG. 2, management service 204 may generate a second communication signal 220, which is transmitted from management service 204. Second communication signal 220 includes the instruction to initiate remediation of electronic device 102. For example, the generated instruction may be enabled to be transmitted to electronic device 102 in second communication signal 220 after reaching the end of the queue and/or when management service 204 determines that communications are possible with electronic device 102. For instance, electronic device 102 may become communicatively coupled with network 206 by interaction by thief 104 with electronic device 102, by electronic device 102 automatically coupling with network 206, or by management service 204 transmitting a "wake up" signal to electronic device 102 (e.g., if electronic device 102 is in a sleep mode, hibernating mode, or is shutdown), which successfully enables communications with electronic device 102, before transmitting second communication signal 220. After receiving the instruction in second communication signal 220, electronic device 102 may implement one or more remediation policies. Examples of such remediation policies are described further below.

Figure 4:
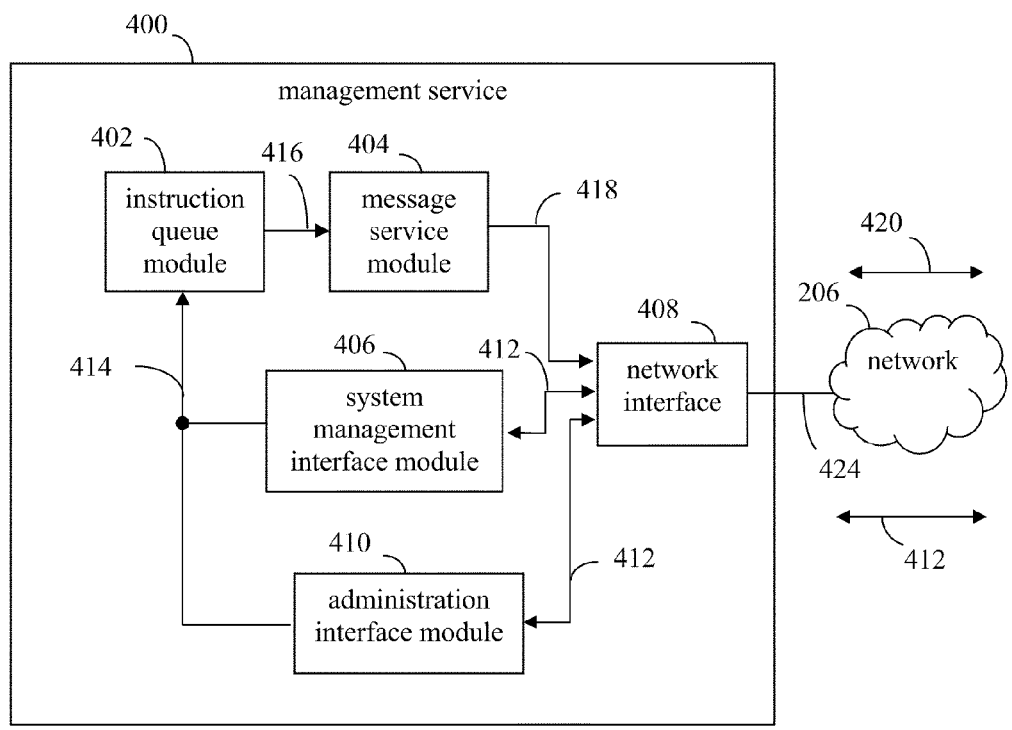
FIG. 4 shows a block diagram of a management service, according to an example embodiment of the present invention.
Figure 5:
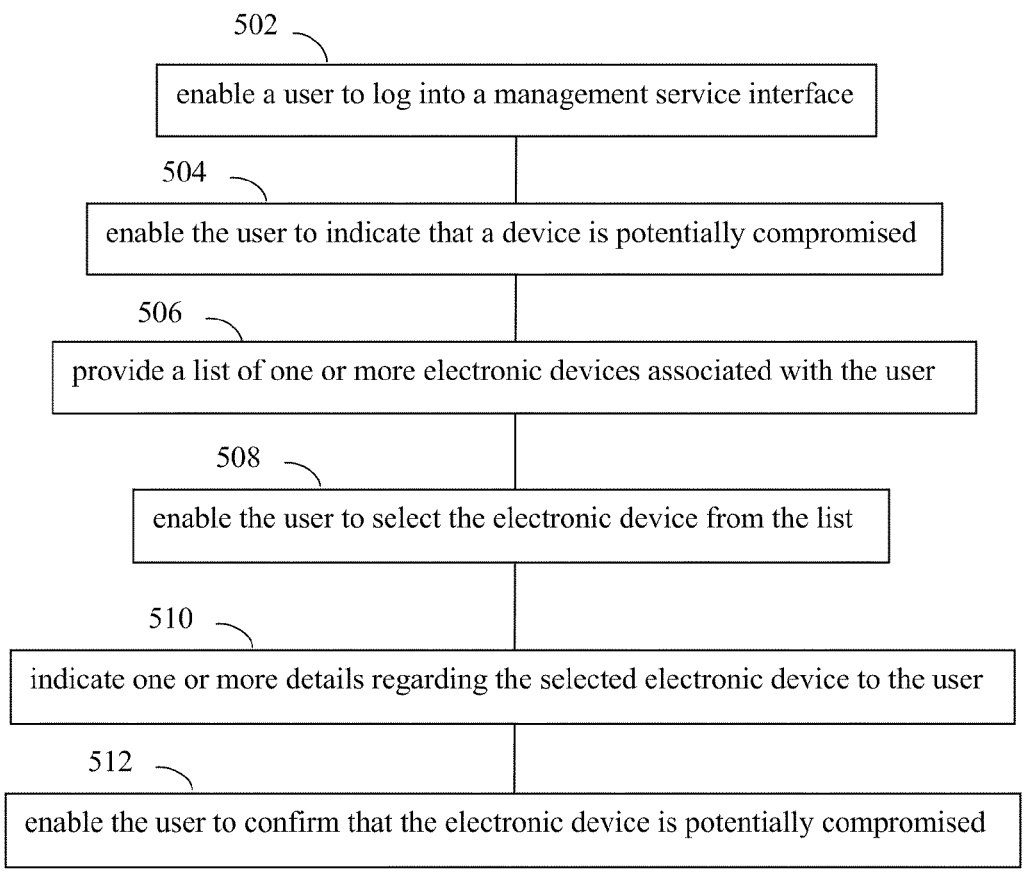
FIG. 5 shows a flowchart of a process for receiving an indication that an electronic device is missing, according to an example embodiment of the present invention.

Management service 204 may be configured in various ways to perform its functions. For instance, FIG. 4 shows a block diagram of management service 400, according to an example embodiment. Management service 400 is an example of management service 204 shown in FIG. 2. As shown in FIG. 4, management service 400 includes an instruction queue module 402, a message service module 404, a system management interface module 406, a network interface 408, and an administration interface module 410. These elements of system management interface 400 are described as follows with regard to FIG. 5. FIG. 5 shows a flowchart 500 providing a process for receiving an indication that an electronic device is missing, according to an example embodiment. In an embodiment, a portion or the entirety of flowchart 500 may be performed by management service 400. Other structural and operational embodiments will be apparent to persons skilled in the relevant art(s) based on the discussion regarding flowchart 500.

As shown in FIG. 5, flowchart 500 begins with step 502. In step 502, a user is enabled to log into a management service interface. Referring to FIG. 2, victim user 106 (using computer 208), admin user 216 (using computer 210), or other user may be enabled to log into management service 204 to report that electronic device 102 is potentially compromised. Referring to FIG. 4, system management interface module 406 may provide a management interface for computers managed by management service 400, including computer 208 used by victim user 106 to report electronic device 102 as potentially compromised. For example, system management interface 406 may provide a web page, web service, or other type of interface (e.g., graphical user interface (GUI)) accessible by a browser or other application at computer 208 that enables victim user 106 to report electronic device 102 as at least potentially compromised.

Similarly, administration interface module 410 may provide a system administration interface for administrators of IT managed by management service 400, including enabling computer 210 to be used by admin user 216 to report electronic device 102 as potentially compromised. For example, administration interface module 410 may provide a web page, web service, or other type of interface (e.g., graphical user interface (GUI)) accessible by a browser or other application at computer 210 that enables admin user 216 to report electronic device 102 as potentially compromised.

As shown in FIG. 4, network interface 408 communicatively couples management service 400, including message service module 404, system management interface module 406, and administration interface module 410 with network 206 through a communication link 424. Network interface 408 may be any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, etc. Network interface 408 may enable communication sessions between computer 208 and system management interface module 406 and between computer 210 and administration interface module 410.

For instance, using computer 208, victim user 106 may be enabled to log into a management service interface provided by system management interface module 406. Additionally and/or alternatively, using computer 210, admin user 216 may be enabled to log into a management service interface provided by administrative interface module 410. A communication session 412 is established between computer 208 and system management interface module 406, or between computer 210 and administrative interface module 410, based on whether victim user 106 (or other user) or admin user 216 logged in.

Referring back to FIG. 5, in step 504, the user is enabled to indicate a potentially compromised device. For example, in an embodiment, system management interface module 406 or administrative interface module 410 (based on whether victim user 106 or admin user 216 logged in) enables the user to select an option to report that an electronic device is at least potentially compromised. For example, system management interface module 406 or administrative interface module 410 may generate a user interface displayed at computer 208 or computer 210, respectively, such as a graphical user interface, that enables the user to select an option indicating that an electronic device is potentially compromised.

Figure 6:
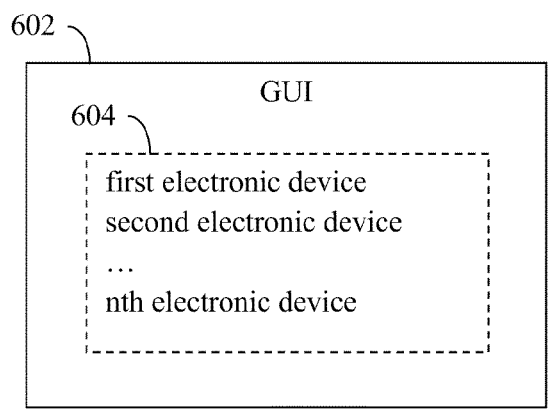
FIG. 6 shows a block diagram of a user interface displaying a list of electronic devices associated with a victim user, according to an example embodiment of the present invention.

In step 506, a list is provided of one or more electronic devices associated with the user. For example, in an embodiment, system management interface module 406 or administrative interface module 410 (based on whether victim user 106 or admin user 216 logged in) may generate a list of one or more electronic devices associated with victim user 106. For instance, the list may be displayed at computer 208 or computer 210 in a user interface, such as a graphical user interface, that enables the user to view the list of one or more electronic devices. The listed electronic devices may include electronic devices assigned to victim user 106 on behalf of an entity that employs or is otherwise associated with victim user 106. For instance, FIG. 6 shows a block diagram of a GUI 602 displaying a list 604 of electronic devices associated with victim user 106, according to an example embodiment. Although first-nth electronic devices are shown included in list 604 in FIG. 6, any number of one or more electronic devices may be included in list 604.

In step 508, the user is enabled to select the electronic device from the list. For example, in an embodiment, system management interface module 406 or administrative interface module 410 (based on whether victim user 106 or admin user 216 logged in) may enable the user (e.g., victim user 106 or admin user 216) to select an electronic device from the list, the selected electronic device being the electronic device believed to potentially be compromised. For example, referring to FIG. 6, the user may be enabled to click on, double click, or otherwise select one of first-nth electronic devices shown included in list 604.

Figure 7:
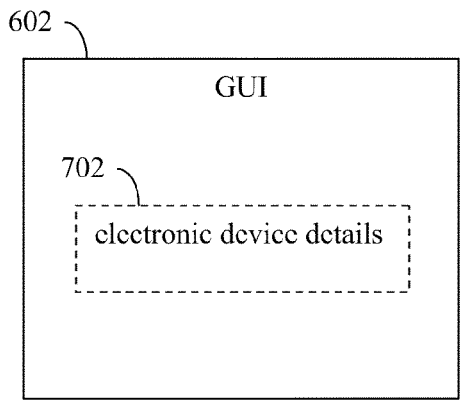
FIG. 7 shows a block diagram of a user interface displaying electronic device details, according to an example embodiment of the present invention.

In step 510, one or more details regarding the selected electronic device is/are indicated to the user. For example, in an embodiment, system management interface module 406 or administrative interface module 410 (based on whether victim user 106 or admin user 216 logged in) may indicate one or more details regarding the selected electronic device to enable the user to verify that the correct electronic device has been indicated. For instance, FIG. 7 shows a block diagram of GUI 602 displaying electronic device details 702 associated with the electronic device selected in step 508. Example details of the selected electronic device that may be included in electronic device details 702 include a model number, a model type, an image of the electronic device, etc.

In step 512, the user is enabled to confirm that the electronic device is potentially compromised. For example, in an embodiment, system management interface module 406 or administrative interface module 410 (based on whether victim user 106 or admin user 216 logged in) may enable the user (e.g., victim user 106 or admin user 216) to confirm or not confirm the selected electronic device as being the electronic device believed to potentially be compromised. The user may confirm the selected electronic device based upon an examination of electronic device details 702 shown in GUI 602 of FIG. 7, for example. Referring to FIG. 7, the user may be enabled to click, double click, or otherwise interact with details 702 or other graphical elements displayed by GUI 602 to confirm that the selected electronic device is potentially compromised.

As shown in FIG. 4, system management interface module 406 or administrative interface module 410 (based on whether victim user 106 or admin user 216 logged in) generates a device remediation instruction 414, which includes an instruction to perform remediation of the selected electronic device (e.g., electronic device 102). Instruction queue module 402 receives device remediation instruction 414, and is configured to enter device remediation instruction 414 in a queue of instructions to be transmitted to electronic devices from management service 402 (e.g., according to step 304 of FIG. 3).

When device remediation instruction 414 reaches the end of the queue maintained by instruction queue module 402, instruction queue module 402 outputs instruction 414 as a current device remediation instruction 416. Message service module 404 receives current device remediation instruction 416, and is configured to instruct the indicated electronic device to perform remediation. For example, as shown in FIG. 4, message service module 404 generates a remediation message 418. Remediation message 418 is configured as an instruction to initiate remediation of the indicated electronic device, and may include one or more remediation policies for the electronic device. For example, remediation message 418 may include a code (e.g., a secure, private code directed to electronic device 102) that when received by electronic device 102 enables remediation. As shown in FIG. 4, remediation message 418 is received at network interface 408, and is transmitted over communication link 424 through network 206 by network interface 408 to electronic device 102, directly or indirectly, in a communication session 420 (e.g., according to step 306 of FIG. 3). For example, in an embodiment, remediation message 418 may be transmitted directly to electronic device 102. In another embodiment, remediation message 418 may be transmitted to an intermediary, such as phone service provider 202 (e.g., in the form of a text message), which may transmit remediation message 418 to electronic device 102.

Figure 8:
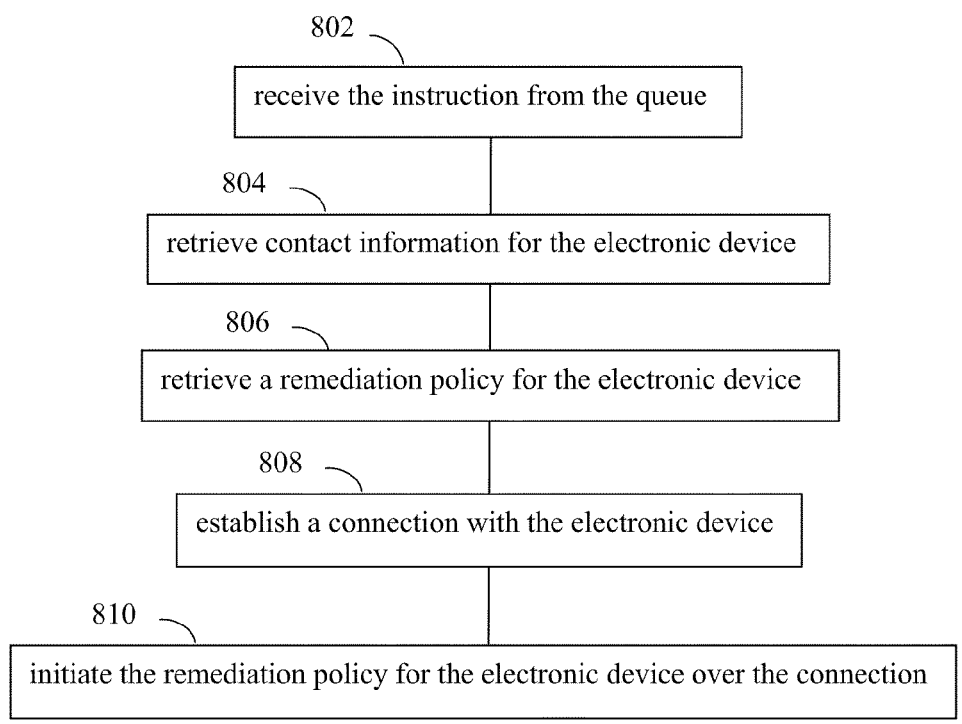
FIG. 8 shows a flowchart providing a process for initiating remediation at an electronic device, according to an example embodiment of the present invention.

Message service module 404 may be configured in various ways to initiate remediation of electronic device 102. For instance, FIG. 8 shows a flowchart 800 providing a process for initiating remediation at the electronic device, according to an example embodiment. In an embodiment, at least a portion of flowchart 800 may be performed by message service module 404. Other structural and operational embodiments will be apparent to persons skilled in the relevant art(s) based on the discussion regarding flowchart 800.

As shown in FIG. 8, flowchart 800 begins with step 802. In step 802, the instruction is received from the queue. For example, as shown in FIG. 4, message service module 404 receives device remediation instruction 416, which is an instruction for remediation for electronic device 102.

In step 804, contact information for the electronic device is retrieved. For example, in an embodiment, message service module 404 may retrieve contact information for electronic device 102 (e.g., an IP address, a phone number, an email address, etc.) from storage (not shown in FIG. 4) at management service 400.

In step 806, a remediation policy for the electronic device is retrieved. For example, in an embodiment, message service module 404 may retrieve a remediation policy for electronic device 102 from storage (not shown in FIG. 4) at management service 400. The remediation policy may indicate one or more remediation processes to be performed by electronic device 102.

In step 808, a connection with the electronic device is established. For example, as shown in FIG. 4, and described above, communication session 420 may be established between management service 400 and electronic device 102.

In step 810, the remediation policy for the electronic device is initiated over the connection. For example, as shown in FIG. 4, remediation message 418 may be transmitted directly to electronic device 102 from management service 400. Remediation message 418 includes the remediation policy retrieved in step 806. Example remediation policies/processes are described in further detail further below.

It is noted that in some situations, it may subsequently be determined that electronic device 102 has not been compromised. For example, electronic device 102 may be found when electronic device 102 was correctly or erroneously thought to have been stolen or lost. In such case, if remediation for electronic device 102 was initiated, it may be desired to recover from the remediation. For instance, management service 204 may be configured to transmit a recovery instruction to electronic device 102.

Figure 9:
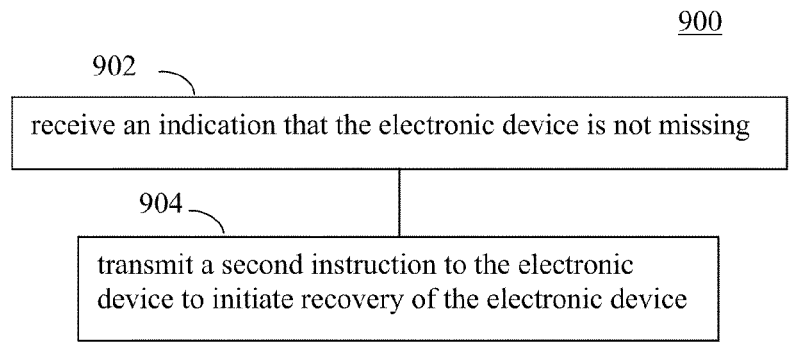
FIG. 9 shows a flowchart providing a process for initiating recovery of an electronic device from remediation, according to an example embodiment of the present invention.

Management service 204 may operate in various ways to initiate recovery at an electronic device, such as electronic device 102. For instance, FIG. 9 shows a flowchart 900 providing a process for initiating recovery of an electronic device from remediation, according to an example embodiment. In an embodiment, flowchart 900 may be performed by management service 204. Other structural and operational embodiments will be apparent to persons skilled in the relevant art(s) based on the discussion regarding flowchart 900.

As shown in FIG. 9, flowchart 900 begins with step 902. In step 902, an indication that the electronic device is not potentially compromised is received. For instance, management service 204 shown in FIG. 2 may receive a communication signal that contains an indication that electronic device 102 is not believed to be potentially compromised. The communication signal may be generated by electronic device 102, first computer 218, or second computer 210. For example, after ascertaining further circumstances, electronic device 102 may be configured to revise its earlier prediction that it has been potentially compromised to a prediction that it is not compromised. For instance, victim user 106 may have logged into electronic device 102 (e.g., with a password), and/or other evidence may be received or sensed by electronic device 102 indicating that it is not likely to be compromised. As a result, electronic device 102 may transmit an indication to management service 204 (via the communication signal) that electronic device 102 is not compromised. In another example, upon locating electronic device 102, or otherwise ascertaining electronic device 102 is not compromised, victim user 106 may interact with computer 208, or admin user 216 may interact with computer 210 to provide the indication to management service 204 that electronic device 102 is not compromised.

In step 904, a second instruction is transmitted to the electronic device to initiate recovery of the electronic device. For example, in an embodiment, management service 204 may transmit a communication signal that includes an instruction to initiate recovery from remediation at electronic device 102. For instance, the instruction may include a re-enable code directed to electronic device 102. The generated instruction may be enabled to be transmitted from electronic device 102 in the communication signal after reaching the end of an instruction queue and/or when management service 204 determines that communications are possible with electronic device 102. After receiving the instruction, electronic device 102 may implement a recovery from the previously implemented remediation policy.

Figure 10:
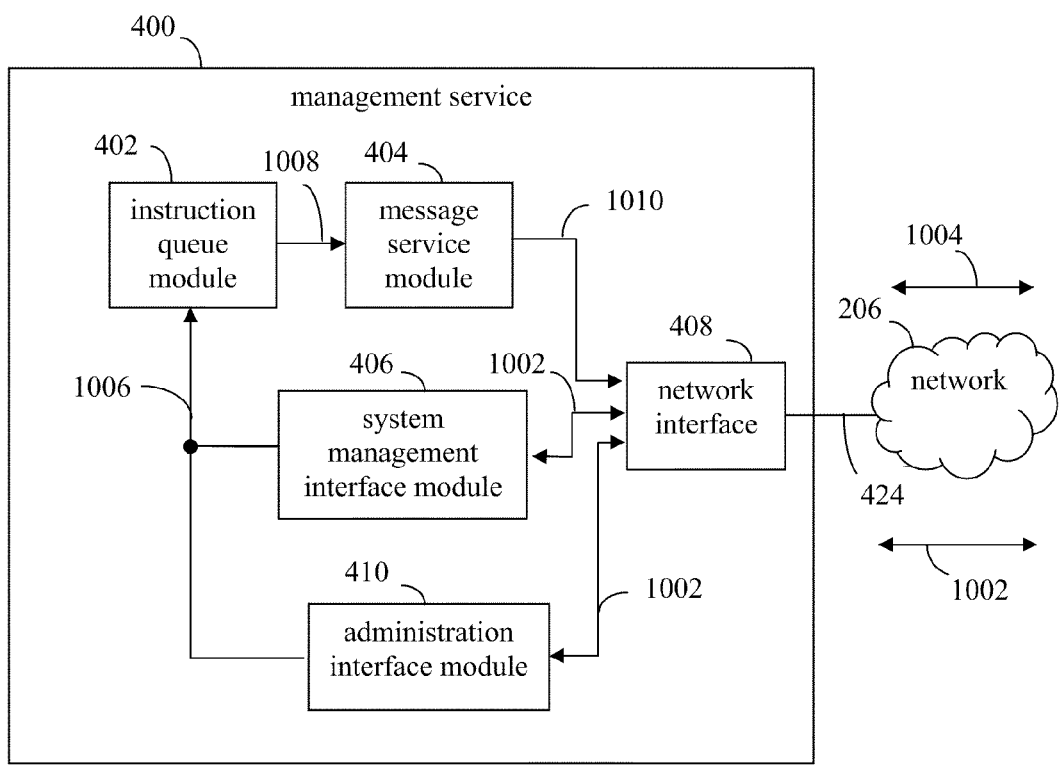
FIG. 10 shows a block diagram of a management service, according to an example embodiment of the present invention.
Figure 11:
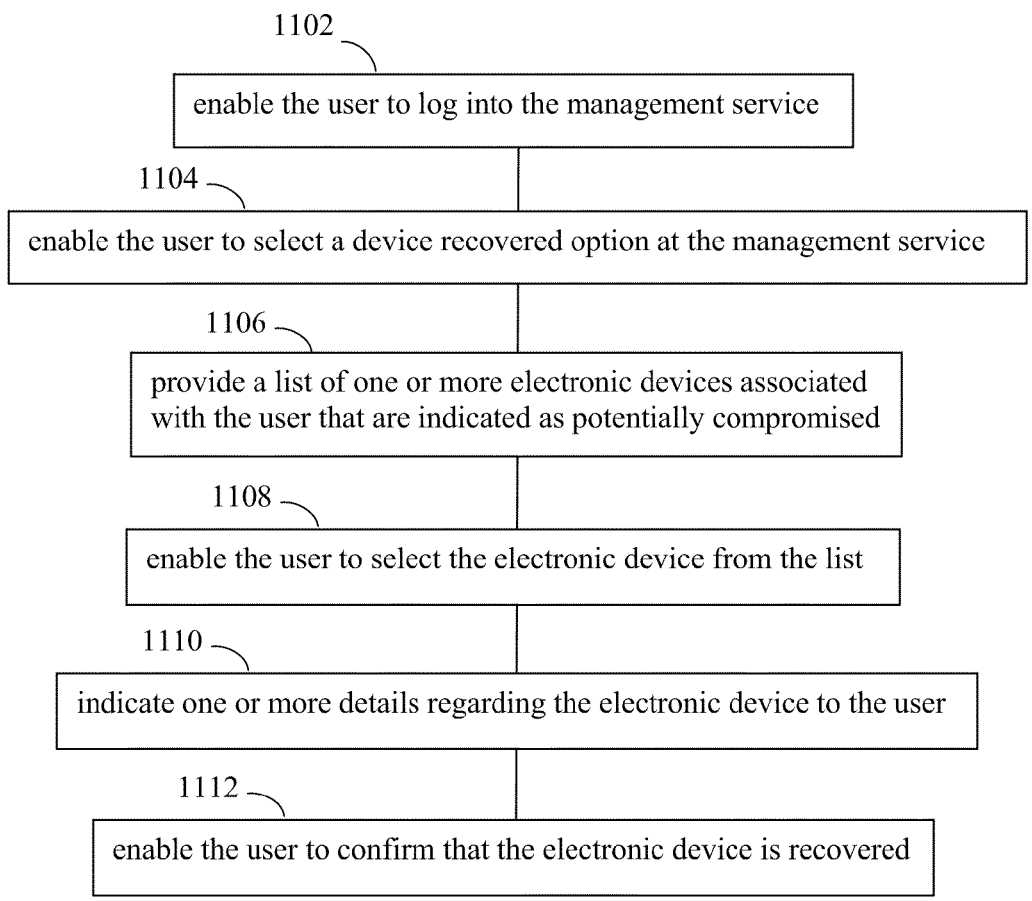
FIG. 11 shows a flowchart providing a process for initiating recovery of an electronic device, according to an example embodiment of the present invention.

In an embodiment, management service 400 of FIG. 4 may be configured initiate a recovery of electronic device 102. For instance, FIG. 10 shows a block diagram of management service 400, according to an example embodiment. For example, management service 400 may initiate recovery of an electronic device according to FIG. 11, which shows a flowchart 1100 providing a process for initiating recovery of an electronic device, according to an example embodiment. As shown in FIG. 11, flowchart 1100 begins with step 1102.

In step 1102, the user is enabled to log into the management service. In a similar manner as described above with respect to step 502 of flowchart 500 (FIG. 5), victim user 106 (using computer 208), admin user 216 (using computer 210), or other user may be enabled to log into management service 204 to report that electronic device 102 is no longer considered to be potentially compromised. As shown in FIG. 10, a communication session 1002 may be established between computer 208 and system management interface module 406, or between computer 210 and administrative interface module 410, based on whether victim user 106 (or other user) or admin user 216 logged in.

In step 1104, the user is enabled to select a device recovered option at the management service. For example, in an analogous manner as described above with respect to step 504 (FIG. 5), system management interface module 406 or administrative interface module 410 (based on whether victim user 106 or admin user 216 logged in) enables the user to select an option to report that an electronic device has been physically recovered or otherwise ascertained to no longer be potentially compromised.

In step 1106, a list is provided of one or more electronic devices associated with the user that is/are indicated as missing. Step 1106 is optional. In an analogous manner as described above with respect to step 506 (FIG. 5), system management interface module 406 or administrative interface module 410 (based on whether victim user 106 or admin user 216 logged in) may generate a list of one or more electronic devices associated with victim user 106 that are reported to be missing or otherwise potentially compromised. If one device associated with victim user 106 is indicated as potentially compromised, steps 1106, 1108, and 1110 may be skipped.

In step 1108, the user is enabled to select the electronic device from the list. Step 1108 is optional. In an analogous manner as described above with respect to step 508 (FIG. 5), system management interface module 406 or administrative interface module 410 (based on whether victim user 106 or admin user 216 logged in) may enable the user (e.g., victim user 106 or admin user 216) to select an electronic device from the list, the selected electronic device being the electronic device that is no longer potentially compromised.

In step 1110, one or more details regarding the electronic device is/are indicted to the user. Step 1110 is optional. In an analogous manner as described above with respect to step 510 (FIG. 5), system management interface module 406 or administrative interface module 410 (based on whether victim user 106 or admin user 216 logged in) may indicate one or more details regarding the selected electronic device to enable the user to verify that the correct electronic device has been indicated.

In step 1112, the user is enabled to confirm that the electronic device is recovered. In an analogous manner as described above with respect to step 512 (FIG. 5), system management interface module 406 or administrative interface module 410 (based on whether victim user 106 or admin user 216 logged in) may enable the user (e.g., victim user 106 or admin user 216) to confirm or not confirm the selected electronic device as being the electronic device that is no longer considered compromised.

As shown in FIG. 10, system management interface module 406 or administrative interface module 410 (based on whether victim user 106 or admin user 216 logged in) generates a device recovery instruction 1006, which includes an instruction to perform recovery at the selected electronic device (e.g., electronic device 102). Instruction queue module 402 receives device recovery instruction 1006, and is configured to enter device recovery instruction 1006 in a queue of instructions to be transmitted to electronic devices from management service 402.

When device recovery instruction 1006 reaches the end of the queue maintained by instruction queue module 402, instruction queue module 402 generates a current device recovery instruction 1008. Message service module 404 receives current device recovery instruction 1008, which is configured to instruct the indicated electronic device to perform recovery. As shown in FIG. 10, message service module 404 generates a recovery message 1010. Recovery message 1010 is configured as an instruction to initiate recovery of the indicated electronic device, and may include one or more recovery policies for the electronic device. As shown in FIG. 10, recovery message 1010 is received at network interface 408, and is transmitted over communication link 424 through network 206 by network interface 408 to electronic device 102, directly or indirectly, in a communication session 1004 (e.g., according to step 904 of FIG. 9). In an embodiment, recovery message 1010 may be transmitted directly to electronic device 102. In another embodiment, recovery message 1010 may be transmitted to an intermediary, such as phone service provider 202 (e.g., in the form of a text message), which may transmit recovery message 1010 to electronic device 102.

Management service 400, instruction queue module 402, message service module 404, system management interface module 406, and administration module 410 may be implemented in hardware, software, firmware, or any combination thereof. For example, management service 400, instruction queue module 402, message service module 404, system management interface module 406, and/or administration module 410 may be implemented as computer program code configured to be executed in one or more processors. Alternatively, management service 400, instruction queue module 402, message service module 404, system management interface module 406, and/or administration module 410 may be implemented as hardware logic/electrical circuitry.

B. Example Electronic Device Remediation Embodiments

Figure 12:
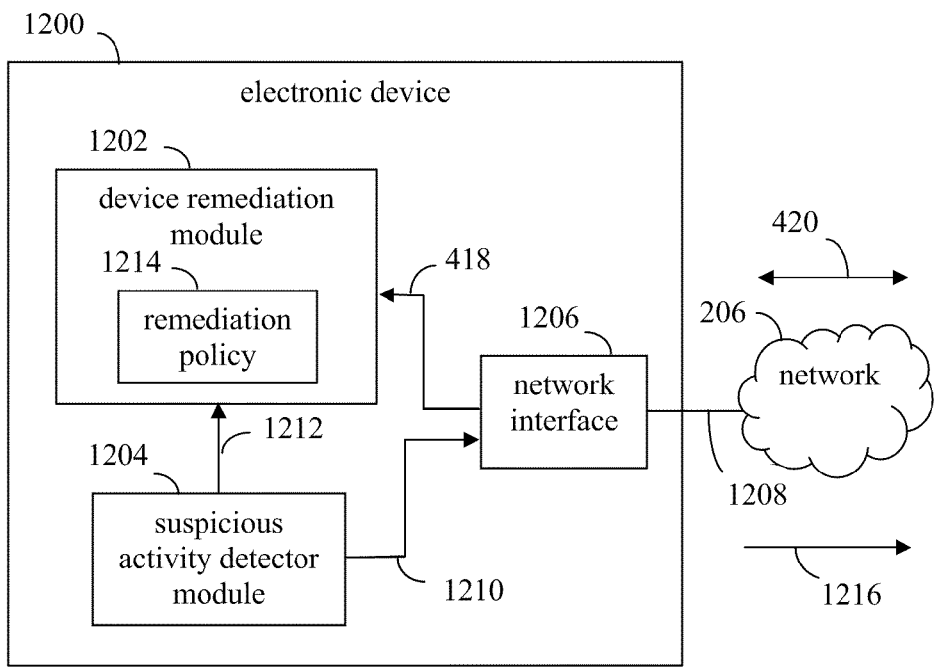
FIG. 12 shows a block diagram of an electronic device, according to an example embodiment of the present invention.
Figure 13:
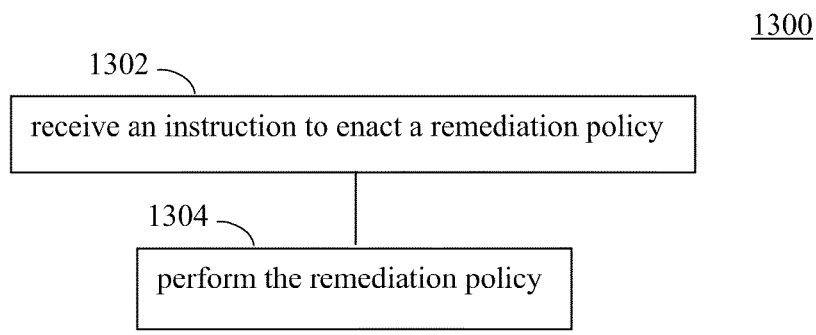
FIG. 13 shows a flowchart providing a process for performing remediation in a potentially compromised electronic device, according to an example embodiment of the present invention.

Electronic device 102 may be configured in various ways to perform remediation when determined to be potentially compromised. For instance, FIG. 12 shows a block diagram of an electronic device 1200, according to an example embodiment of the present invention. Electronic device 1200 is an example of electronic device 102. As shown in FIG. 12, electronic device 1200 includes a device remediation module 1202, a suspicious activity detector module 1204, and a network interface 1206. In an embodiment, electronic device 1200 may operate as indicated in FIG. 13. FIG. 13 shows a flowchart 1300 providing a process for performing remediation in a potentially compromised electronic device, according to an example embodiment. Electronic device 1200 and flowchart 1300 are described as follows. Further structural and operational embodiments will be apparent to persons skilled in the relevant art(s) based on the discussion regarding electronic device 1200 and flowchart 1300.

As shown in FIG. 10, flowchart 1300 begins with step 1302. In step 1302, an instruction to enact a remediation policy is received. Referring to FIG. 2, in an embodiment, electronic device 102 may receive second communication signal 220 from management service 204, which includes the instruction to initiate remediation of electronic device 102. With reference to FIG. 12, electronic device 1200 may receive a remediation instruction (e.g., remediation message 418) during communication session 420 with management service 400. As described above, the instruction may alternatively be received from phone service provider 202, or in still another embodiment, the instruction may be generated internally to electronic device.

As shown in FIG. 12, network interface 1206 communicatively couples electronic device 1200 with network 206 through a communication link 1208. Network interface 1206 may be any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, etc.

In an embodiment, network interface 1206 participates in communication session 420, and outputs remediation message 418. Remediation message 418 is received by device remediation module 1202, which instructs device remediation module 1202 to implement remediation policy 1214. In another embodiment, suspicious activity detector module 1204 is configured to detect one or more suspicious activities that indicate electronic device 1200 may have been compromised. In the event that suspicious activity detector module 1204 detects a sufficient amount of suspicious activity, suspicious activity module 1204 may generate a remediation instruction 1212. Remediation instruction 1212 is received by device remediation module 1202, which instructs device remediation module 1202 to implement remediation policy 1214. Alternatively, instead of generating remediation instruction 1212, suspicious activity detector module 1204 may generate a suspicious activity indicator signal 1210, which may be transmitted to management service 204 (e.g., management service 400 of FIG. 4) in a communication signal 1216. As a result of receiving suspicious activity indicator signal 1210, management service 204 may perform various functions. For example, management service 204 may generate and provide remediation message 418 to electronic device 1200 in communication session 420, as described above. Management system 400 may be configured to contact admin user 216 (e.g., via email, text message, phone) at computer 210 or communication device 214 to alert an IT department, or to contact victim user 106 to inform victim user 106 (e.g., at a communication device of victim user 106) about electronic device 1200 being potentially compromised. Victim user 106 may then indicate whether electronic device 1200 is missing. Such policies for contacting a user may be different depending on the user's job and/or location. A company may have multiple policies tailored to different employee roles.

In step 1304, the remediation policy is performed. As shown in FIG. 12, as a result of receiving remediation message 418 or remediation instruction 1212, device remediation module 1202 implements one or more remediation policies, such as a remediation policy 1214. Remediation policy 1214 includes one or more remediation processes to be performed in the event that electronic device 102 is compromised. Remediation policy 1214 may be maintained in device remediation module 1202, or may be received from management system 400 with remediation message 418.

Figure 14:
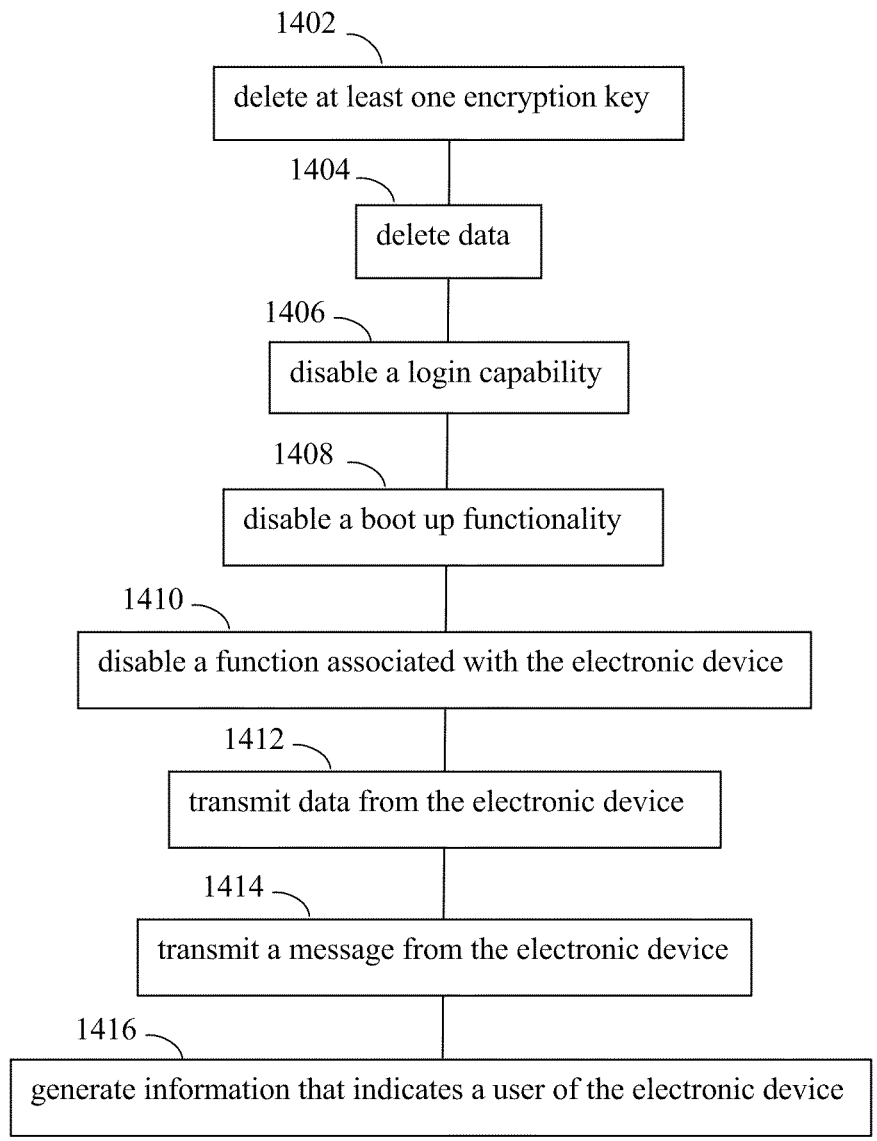
FIG. 14 shows a flowchart providing a process for remediation in a potentially compromised electronic device, according to an example embodiment of the present invention.

Various remediation policies may be included in remediation policy 1214 that are performed by device remediation module 1202. For instance, FIG. 14 shows a flowchart 1400 providing a process for performing one or more remediation policies at a potentially compromised electronic device, according to an example embodiment. In an embodiment, a portion or the entirety of flowchart 1400 may be performed by device remediation module 1202 upon receipt of a remediation instruction. Any one or more of the steps shown in flowchart 1400 may be performed in embodiments. Other structural and operational embodiments will be apparent to persons skilled in the relevant art(s) based on the discussion regarding flowchart 1400.

As shown in FIG. 14, flowchart 1400 begins with step 1402. In step 1402, at least one encryption key is deleted. For example, in an embodiment, device remediation module 1202 may be configured to delete local encryption keys to protect local copies of private encrypted data from access.

In step 1404, data is deleted. For example, device remediation module 1202 may be configured to delete data (e.g., stored in particular directories, etc.) indicated as private and/or confidential, including banking or other financial account information, personal private data, message information including emails and/or text messages, corporate data, intellectual property (e.g., information regarding inventions), etc. Local caches (e.g., browser caches that may contain unencrypted versions of data) may be deleted.

In step 1406, a login capability is disabled. For example, device remediation module 1202 may be configured to lockout local login attempts so that electronic device 102 cannot be used by thief 104.

In step 1408, a boot up functionality is disabled. For instance, device remediation module 1202 may reconfigure electronic device 102 so that boot up from OS (operating system) is enabled but boot up from external storage (e.g., from CDROM, USB, etc.) is disabled. Furthermore, device remediation module 1202 may reconfigure electronic device 102 so that the OS may boot up in a mode that is reduced in functionality.

In step 1410, a function associated with the electronic device is disabled. For instance, device remediation module 1202 may be configured to disable one or more applications on electronic device 1200, to disallow an administrator elevation on electronic device 1200, to disable running of LOB (line of business) applications, and/or to disallow one or more OS functions (e.g., disable format, disallow private data to be copied from electronic device 1200, etc.).

In step 1412, data is transmitted from the electronic device. For instance, device remediation module 1202 may be configured to copy from electronic device 1200 private data, such as private data that has not yet been synchronized and/or backed-up to a service. The data may be copied to a remote location over network 206 (e.g., to an internet web service using a secure channel).

In step 1414, a message is transmitted from the electronic device. For instance, device remediation module 1202 may be configured to generate a message that is transmitted from electronic device 1200 to verify the loss/theft of electronic device 1200 (if suspicious activity detector module 1204 is present to detect suspicious activity), to provide a status (e.g., a status of the progress of remediation being performed on electronic device 1200), etc. The message may have the form of an email, a text message, a communication session, etc.

Figure 15:
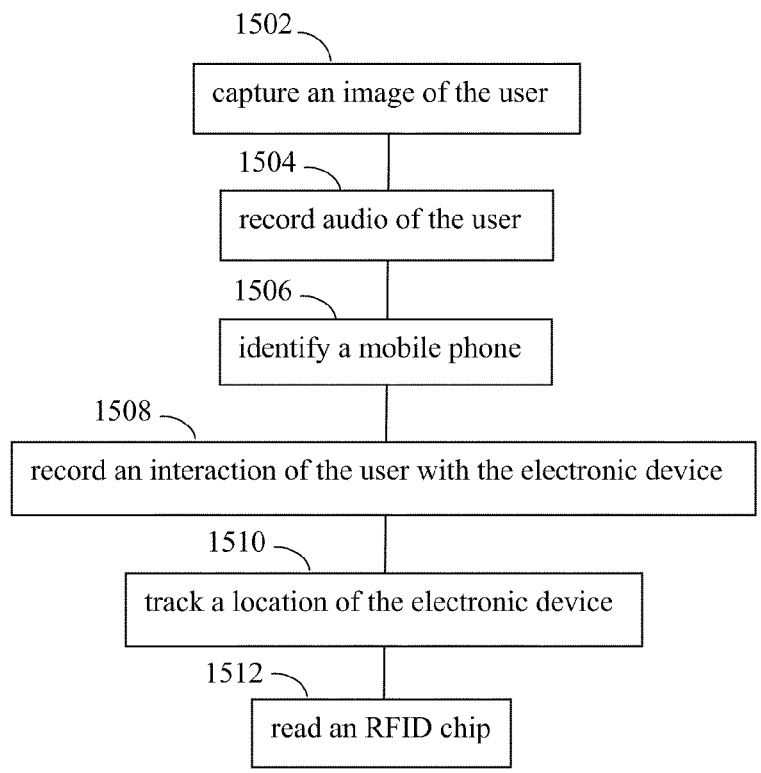
FIG. 15 shows a flowchart providing a process for generating information that indicates an identity of a user of the electronic device, according to an example embodiment of the present invention.

In step 1416, information is generated that indicates a user of the electronic device. For instance, device remediation module 1202 may be configured to record information indicative of a user of electronic device 1200, and to transmit the recorded information from electronic device 1200 to a remote location (e.g., a web service). The recorded information may be analyzed at the remote location in an attempt to identify thief 104 and/or an environment local to electronic device 1200 so that electronic device 1200 may be located. Device remediation module 1202 may be configured to perform step 1416 in various ways. For instance, FIG. 15 shows a flowchart 1500 providing a process for generating information that indicates a user of the electronic device, according to an example embodiment. In an embodiment, a portion or the entirety of flowchart 1500 may be performed by device remediation module 1202. Other structural and operational embodiments will be apparent to persons skilled in the relevant art(s) based on the discussion regarding flowchart 1500.

Additional and/or alternative actions to those shown in FIG. 14 may be performed. For instance, in an embodiment, an alert may be transmitted from electronic device 1200 to an owner of electronic device 1200 (e.g., victim user 106) at a communication device (other than electronic device 1200, such as a cell phone, etc.) associated with the owner. The alert may request verification from the owner that electronic device 1200 is potentially compromised, and may request instructions for subsequent remediation-related or non-remediation related actions. Still further, electronic device 1200 may "call out for help," by outputting an alarm signal and/or voice audio (e.g., "help, this device has been stolen," etc.) from a speaker of electronic device 1200 to draw attention from other persons.

As shown in FIG. 15, flowchart 1500 begins with step 1502. In step 1502, an image of the user is captured. For instance, device remediation module 1202 may be configured to use a webcam or other image capturing device associated with electronic device 1200 to capture one or more images, including an image stream/video stream. The captured image(s) may include an image of thief 104 and/or a local environment, which may be used to locate electronic device 1200.

In step 1504, audio of the user is recorded. For instance, device remediation module 1202 may be configured to use a microphone integrated with electronic device 1200 to capture audio. The captured audio may include a voice of thief 104 and/or sounds of a local environment, which may be used to locate electronic device 1200.

In step 1506, a mobile phone is identified. For instance, device remediation module 1202 may be configured to determine an identification number of a nearby cell phone, such as communication device 212 of thief 104 shown in FIG. 2, which can be mapped to an owner, and may be used to locate electronic device 1200.

In step 1508, an interaction of the user with the electronic device is recorded. For instance, device remediation module 1202 may be configured to record keystrokes, mouse pointer actions, and/or further interactions with electronic device 1200, which can be used to locate electronic device 1200.

In step 1510, a location of the electronic device is tracked. For instance, device remediation module 1202 may access a global positioning system (GPS) receiver integrated with electronic device 1200 to track a position of electronic device 1200, which may be used to locate electronic device 1200.

In step 1512, an RFID (radio frequency identification) tag is read. For example, electronic device 1200 may incorporate an RFID reader configured to read RFID chips in the vicinity. For instance, an RFID chip may be embedded in a passport, a license, an electronic device, or other article associated with thief 104. The RFID reader may read an identification number and/or other information from the RFID chip, which may be used to identify thief 104.

Figure 16:
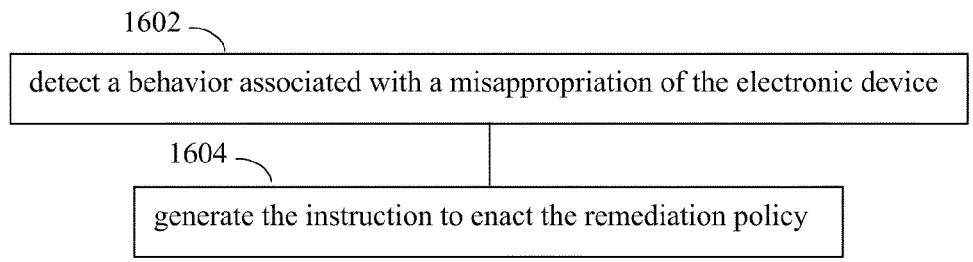
FIG. 16 shows a flowchart providing a process for receiving an instruction to enact a remediation policy, according to an example embodiment of the present invention.

As described above, according to step 1302, device remediation module 1202 may receive a remediation instruction from a remote entity, such as management system 400 (FIG. 4). In another embodiment, device remediation module 1202 may receive the remediation instruction from suspicious activity detector module 1204. For instance, FIG. 16 shows a flowchart 1600 providing a process for receiving an instruction to enact a remediation policy, according to an example embodiment. In an embodiment, a portion or the entirety of flowchart 1600 may be performed by suspicious activity detector module 1204. Other structural and operational embodiments will be apparent to persons skilled in the relevant art(s) based on the discussion regarding flowchart 1600.

As shown in FIG. 16, flowchart 1600 begins with step 1602. In step 1602, a behavior associated with a misappropriation of the electronic device is detected. In an embodiment, suspicious activity detector module 1204 may be configured to detect one or more behaviors associated with a misappropriation of electronic device 1200.

In step 1604, the instruction to enact the remediation policy is generated. Suspicious activity detector module 1204 may generate remediation instruction 1212, which is an instruction to enact a remediation policy, such as remediation policy 1214, for electronic device 1200. Alternatively, suspicious activity detector module 1204 may generate suspicious activity indicator signal 1210, which is transmitted to management service 400. As a result of receiving suspicious activity indicator signal 1210, management service 400 may generate remediation message 418, which is an instruction to enact a remediation policy, such as remediation policy 1214, for electronic device 1200.

Figure 17:
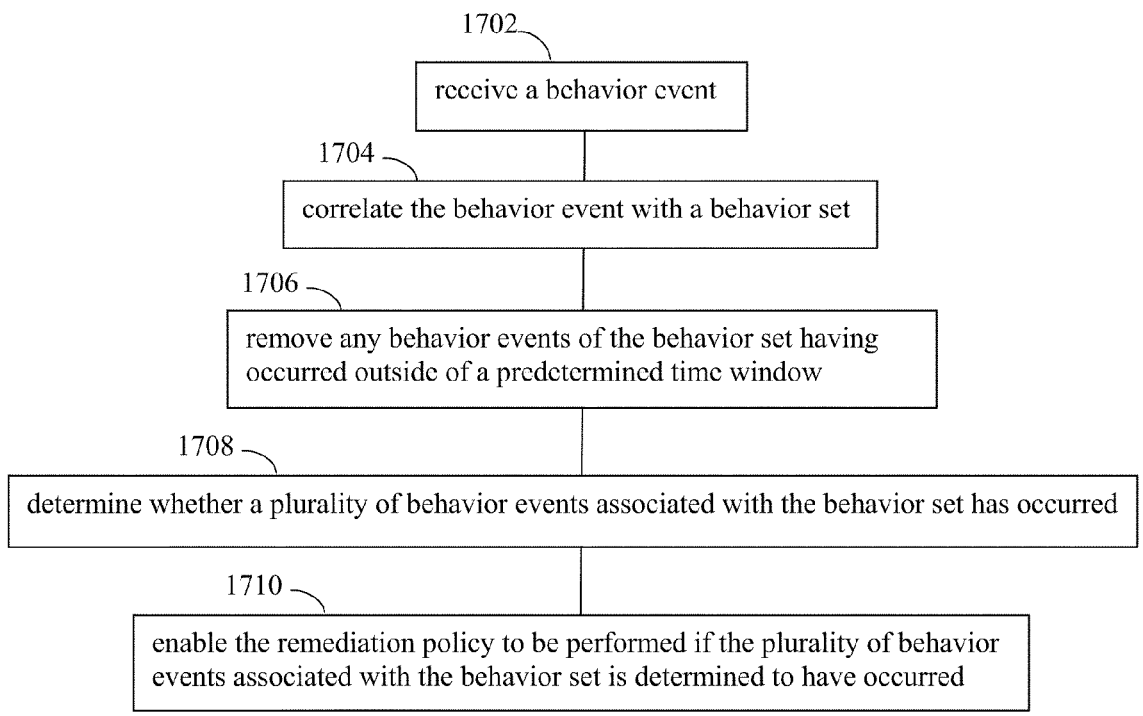
FIG. 17 shows a flowchart providing a process for detecting a behavior associated with a misappropriation of an electronic device, according to an example embodiment of the present invention.
Figure 18:
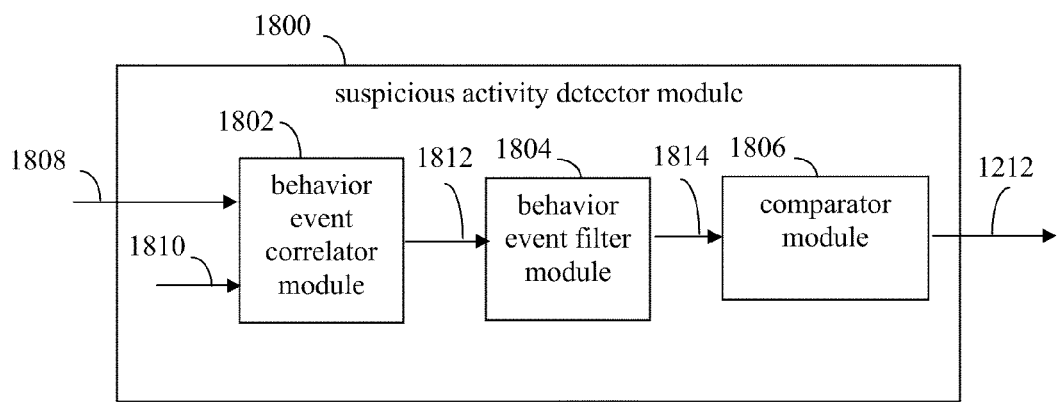
FIG. 18 shows a block diagram of a suspicious activity detector module, according to an example embodiment of the present invention.

Step 1602 may be implemented in various ways by suspicious activity detector module 1204. For instance, FIG. 17 shows a flowchart 1700 providing a process for detecting a behavior associated with a misappropriation of an electronic device, according to an example embodiment. In an embodiment, a portion or the entirety of flowchart 1700 may be performed by suspicious activity detector module 1204. For instance, FIG. 18 shows a block diagram of a suspicious activity detector module 1800, according to an example embodiment. Suspicious activity detector module 1800 is an example of suspicious activity detector module 1204. As shown in FIG. 18, suspicious activity detector module 1800 includes a behavior event correlator module 1802, a behavior event filter module 1804, and a comparator module 1806. Other structural and operational embodiments will be apparent to persons skilled in the relevant art(s) based on the discussion regarding flowchart 1700.

As shown in FIG. 17, flowchart 1700 begins with step 1702. In step 1702, a behavior event is received. For example, as shown in FIG. 18, behavior event correlator module 1802 receives a behavior event 1808. Behavior event 1808 is one of a plurality predetermined events that may be received that indicate the occurrence of a corresponding event. Examples of behavior event 1808 include interactions with electronic device 1200, such as opening electronic device 1200 (e.g., to access batteries, circuit cards, etc.), accessing of particular data stored in electronic device 1200 (e.g., banking or other financial account information, personal private data, message information including emails and/or text messages, corporate data, intellectual property related information, a key-store, etc.), copying such data onto a storage device (e.g., a USB storage device), one or more failed login attempts, expiration of login credentials, an attempt to boot up electronic device 1200 from a device other than the regular boot disk, an amount of time that electronic device 102 has been unused, a detected location for electronic device 1200 outside of a normal region of operation (e.g., detected location does not match location indicated in meeting appointment in calendar) and/or outside of an assigned region designated by an entity (e.g., employer of victim user 106), detecting that a constraints placed on electronic device 1200 via administrative policy is being violated, and/or further events that may indicate that electronic device 1200 is lost or that thief 104 is tampering with electronic device 1200.

In step 1704, the behavior event is correlated with a behavior set. As shown in FIG. 18, behavior event correlator module 1802 receives one or more behavior set(s) 1810. Each behavior set of behavior set(s) 1810 includes one or more behavior events that relate to the behavior set. For example, a first behavior set may be a "lost device" behavior set. The lost device behavior set may indicate one or more behaviors that may indicate that electronic device 1200 is lost. For example, the lost device behavior set may indicate a first behavior event of a threshold amount of time of lack of use of electronic device 102. A second behavior set may be a "stolen device" behavior set. The stolen device behavior set may indicate one or more behaviors that may indicate that electronic device 1200 has been stolen. For example, the stolen device behavior set may indicate a first behavior event of a threshold number of failed login attempts and a second behavior event of an access of private data on electronic device 1200, etc. Behavior set(s) 1810 may have any suitable form, including the form of a data structure such as a table, data array, etc, and may be stored in storage of electronic device 1200.

Behavior event correlator module 1802 is configured to correlate behavior event 1808 with one or more of behavior set(s) 1810. Behavior event 1808 is correlated with any behavior sets of behavior set(s) 1810 that include a behavior event matching behavior event 1808, and the correlated behavior set(s) are output as correlated behavior set(s) 1812.

In step 1706, any behavior events of the behavior set having occurred outside of a predetermined time window are removed. Step 1706 is optional, and is used to remove behavior events from consideration that have occurred relatively distantly in time so as not to be considered any longer relevant. For example, in an embodiment, behavior event filter module 1804 receives correlated behavior set(s) 1812, and removes behavior events correlated with the behavior sets of correlated behavior set(s) 1812 that have occurred outside of a predetermined time window. As shown in FIG. 18, behavior event filter module 1804 generates filtered correlated behavior set(s) 1814.

In step 1708, whether a plurality of behavior events associated with the behavior set has occurred is determined. For example, in an embodiment, comparator module 1806 receives filtered correlated behavior set(s) 1814, and determines whether the behavior events included in each received behavior set have occurred. For example, with regard to the example stolen device behavior set, if behavior events of a threshold number of failed login attempts, an access of private data on electronic device 1200, and any other associated behavior events were correlated with the stolen device behavior set (step 1704), and the predetermined time window has not expired (step 1706), comparator module 1806 determines that the behavior events associated with the stolen device behavior set have occurred. As shown in FIG. 18, comparator module 1806 may generate remediation instruction 1212 (or suspicious activity indicator signal) if the behavior events corresponding to one or more behavior sets are determined to have occurred. If the behavior events have not occurred for at least one of the behavior sets, comparator module 1806 does not generate remediation instruction 1212.

In step 1710, the remediation policy is enabled to be performed if the plurality of behavior events associated with the behavior set is determined to have occurred. As described above, remediation instruction 1212 (or suspicious activity indicator signal) indicate that electronic device 1200 has been potentially compromised, and enables device remediation module 1202 to perform remediation of electronic device 1200.

Note that as described above, a recovery instruction (e.g., recovery instruction 1006 of FIG. 10) may be received by the electronic device (e.g., electronic device 1200) that includes an instruction to perform recovery from remediation. Device remediation module 1202 may receive the recovery instruction (through network interface 1206), and may implement a recovery policy. For example, the recovery policy may be configured to undo the remediation processes that were performed, including recovering encryption keys, restoring data, re-enabling login capability, re-enabling boot-up functionality, re-enabling one or more functions, retrieving data that was transmitted from electronic device 1200, and/or transmitting a recovery message (e.g., to admin user 216, victim user 106, and/or management service 400), Device remediation module 1202, suspicious activity detector module 1204, behavior event correlator module 1802, behavior event filter module 1804, and comparator module 1806 may be implemented in hardware, software, firmware, or any combination thereof. For example, device remediation module 1202, suspicious activity detector module 1204, behavior event correlator module 1802, behavior event filter module 1804, and/or comparator module 1806 may be implemented as computer program code configured to be executed in one or more processors. Alternatively, device remediation module 1202, suspicious activity detector module 1204, behavior event correlator module 1802, behavior event filter module 1804, and/or comparator module 1806 may be implemented as hardware logic/electrical circuitry.

III Further Example Embodiments

FIG. 19 depicts an exemplary implementation of a computer 1900 in which embodiments of the present invention may be implemented. For instance, electronic devices 102 and 1200, computer 208, and computer 210 shown in FIG. 2 may be implemented similarly to computer 1900, and may include one or more features of computer 1900 and/or alternative features. Furthermore, management systems 204 and 400 may be implemented in one or more computers similar to computer 1900. Computer 1900 may be a general-purpose computing device in the form of a conventional personal computer, a mobile computer, or a workstation, for example, or computer 1900 may be a special purpose computing device. The description of computer 1900 provided herein is provided for purposes of illustration, and is not intended to be limiting. Embodiments of the present invention may be implemented in further types of computer systems, as would be known to persons skilled in the relevant art(s).

As shown in FIG. 19, computer 1900 includes a processing unit 1902, a system memory 1904, and a bus 1906 that couples various system components including system memory 1904 to processing unit 1902. Bus 1906 represents one or more of any of several types of bus structures, including a memory bus or memory controller, a peripheral bus, an accelerated graphics port, and a processor or local bus using any of a variety of bus architectures. System memory 1904 includes read only memory (ROM) 1908 and random access memory (RAM) 1910. A basic input/output system 1912 (BIOS) is stored in ROM 1908.

Computer 1900 also has one or more of the following drives: a hard disk drive 1914 for reading from and writing to a hard disk, a magnetic disk drive 1916 for reading from or writing to a removable magnetic disk 1918, and an optical disk drive 1920 for reading from or writing to a removable optical disk 1922 such as a CD ROM, DVD ROM, or other optical media. Hard disk drive 1914, magnetic disk drive 1916, and optical disk drive 1920 are connected to bus 1906 by a hard disk drive interface 1924, a magnetic disk drive interface 1926, and an optical drive interface 1928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1930, one or more application programs 1932, other program modules 1934, and program data 1936. Application programs 1932 or program modules 1934 may include, for example, computer program logic for implementing management service 204, management service 400, instruction queue module 402, message service module 404, system management interface module 406, administration module 410, device remediation module 1202, suspicious activity detector module 1204, behavior event correlator module 1802, behavior event filter module 1804, comparator module 1806, flowchart 300, 500, 800, 900, 1100, 1300, 1400, 1500, 1600, and/or 1700 (including any step of flowcharts 300, 500, 800, 900, 1100, 1300, 1400, 1500, 1600, and/or 1700), and/or any further embodiments as described above.

A user may enter commands and information into the computer 1900 through input devices such as keyboard 1938 and pointing device 1940. Other input devices (not shown) may include a microphone, joystick, game pad, satellite dish, scanner, or the like. These and other input devices are often connected to the processing unit 1902 through a serial port interface 1942 that is coupled to bus 1906, but may be connected by other interfaces, such as a parallel port, game port, or a universal serial bus (USB).

A monitor 1944 or other type of display device is also connected to bus 1906 via an interface, such as a video adapter 1946. In addition to the monitor, computer 1900 may include other peripheral output devices (not shown) such as speakers and printers.

Computer 1900 is connected to a network 1948 (e.g., the Internet) through a network interface or adapter 1950, a modem 1952, or other means for establishing communications over the network. Modem 1952, which may be internal or external, is connected to bus 1906 via serial port interface 1942.

As used herein, the terms "computer program medium" and "computer-readable medium" are used to generally refer to media such as the hard disk associated with hard disk drive 1914, removable magnetic disk 1918, removable optical disk 1922, as well as other media such as flash memory cards, digital video disks, random access memories (RAMs), read only memories (ROM), and the like.

As noted above, computer programs and modules (including application programs 1932 and other program modules 1934) may be stored on the hard disk, magnetic disk, optical disk, ROM, or RAM. Such computer programs may also be received via network interface 1950 or serial port interface 1942. Such computer programs, when executed or loaded by an application, enable computer 1900 to implement features of embodiments of the present invention discussed herein. Accordingly, such computer programs represent controllers of the computer 1900.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a management system, comprising:
   receiving an indication over a communication network that an electronic device remote from the management system is at least potentially compromised;
   queuing an instruction to initiate remediation of the electronic device;
   receiving the instruction from the queue;
   retrieving contact information for the electronic device;
   retrieving a remediation policy for the electronic device;
   transmitting the instruction to the electronic device according to the retrieved contact information with the retrieved remediation policy to initiate remediation of the electronic device;
   receiving an indication over the communication network that the electronic device is not potentially compromised; and
   transmitting a second instruction to the electronic device over the communication network to initiate recovery of the electronic device.

2. The method of claim 1, wherein receiving the indication that the electronic device is at least potentially compromised comprises:
   enabling a user to log into a management service;
   enabling the user to indicate a missing device;
   enabling a list to be displayed of one or more electronic devices associated with the user;
   enabling the user to select the electronic device from the list;
   indicating one or more details regarding the selected electronic device to the user; and
   enabling the user to confirm that the selected electronic device is at least potentially compromised.

3. The method of claim 1, wherein receiving the indication that the electronic device is at least potentially compromised comprises:
   determining that the electronic device is decommissioned.

4. A computer-readable storage device having computer readable logic embodied thereon for enabling a management system to perform a method, the method comprising:
   receiving an indication over a communication network from an electronic device remote from the management system that the electronic device is at least potentially compromised;
   queuing an instruction to initiate remediation of the electronic device;
   receiving the instruction from the queue;
   retrieving contact information for the electronic device;
   retrieving a remediation policy for the electronic device;
   transmitting the instruction to the electronic device over the communication network to initiate remediation of the electronic device;
   receiving an indication that the electronic device is not potentially compromised over the communication network; and
   transmitting a second instruction to the electronic device over the communication network to initiate recovery of the electronic device.

5. The method of claim 1, wherein transmitting the instruction comprises:
   establishing a connection with the electronic device; and
   initiating the remediation policy for the electronic device over the connection.

6. The method of claim 1, wherein receiving the indication that the electronic device is not potentially compromised comprises:
   enabling the user to log into a management service;
   enabling the user to select a device recovered option at the management service;
   enabling a list to be displayed of one or more electronic devices associated with the user that are indicated as missing;
   enabling the user to select the electronic device from the list;
   indicating one or more details regarding the electronic device to the user; and
   enabling the user to confirm that the electronic device is recovered.

7. A management system, comprising:
   a network interface configured as a communication interface with a network;
   a system management interface configured to provide a user interface to enable an indication to be provided over the network that an electronic device remote from the management system is at least potentially compromised, to generate a device remediation instruction, and to receive an indication that the electronic device is not potentially compromised;
   an instruction queue configured to queue the device remediation instruction; and
   a message service configured to receive the device remediation instruction from the queue, to retrieve contact information for the electronic device, to retrieve a remediation policy for the electronic device, to transmit the device remediation instruction over the network to the electronic device according to the retrieved contact information to initiate remediation of the electronic device, and to transmit another instruction to the electronic device to initiate recovery of the electronic device;

the system management interface module is configured to enable a user to log into a management service, to enable the user to select the electronic device, to indicate one or more details regarding the selected electronic device to the user, and to enable the user to confirm that the selected electronic device is at least potentially compromised.

8. The management system of claim 7, wherein the system management interface module is configured to enable a list to be displayed of one or more electronic devices associated with the user, and to enable the user to select the electronic device from the list.

9. The management system of claim 7, wherein the indication that the electronic device is at least potentially compromised is received from the electronic device.

10. The management system of claim 7, wherein the message service module is configured to establish a connection with the electronic device, and to initiate the remediation policy for the electronic device over the connection.

11. The management system of claim 7, wherein the system management interface module is configured to enable the user to log into the management service, to enable the user to select a device recovered option at the management service, to indicate one or more details regarding the electronic device to the user, and to enable the user to confirm that the electronic device is recovered.

12. The management system of claim 7, further comprising:
an administrative interface module configured to provide a user interface to enable an admin user to provide an indication that the electronic device is at least potentially compromised.

13. The computer-readable storage device of claim 4, wherein transmitting the instruction comprises:
establishing a connection with the electronic device; and
initiating the remediation policy for the electronic device over the connection.

14. The computer-readable storage device of claim 4, wherein receiving the indication that the electronic device is not potentially compromised comprises:
enabling the user to log into a management service;
enabling the user to select a device recovered option at the management service;
enabling a list to be displayed of one or more electronic devices associated with the user that are indicated as missing;
enabling the user to select the electronic device from the list;
indicating one or more details regarding the electronic device to the user; and
enabling the user to confirm that the electronic device is recovered.

15. The computer-readable storage device of claim 4, wherein receiving the indication that the electronic device is at least potentially compromised comprises:
determining that the electronic device is decommissioned.

16. The management system of claim 12, wherein the indication provided by the admin user that the electronic device is at least potentially compromised comprises:
a determination that the electronic device is decommissioned.

* * * * *